(12) United States Patent
Capota et al.

(10) Patent No.: US 10,064,023 B2
(45) Date of Patent: Aug. 28, 2018

(54) METHOD AND APPARATUS FOR PROVIDING NOTIFICATIONS

(71) Applicant: HERE Global B.V., Veldhoven (NL)

(72) Inventors: Catalin Capota, Palatine, IL (US); Leo Modica, Sawyer, MI (US); Leon Oliver Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 58 days.

(21) Appl. No.: 14/556,579

(22) Filed: Dec. 1, 2014

(65) Prior Publication Data

US 2016/0157067 A1 Jun. 2, 2016

(51) Int. Cl.
*H04W 4/12* (2009.01)
*H04W 4/021* (2018.01)
*H04W 4/02* (2018.01)

(52) U.S. Cl.
CPC ........... *H04W 4/12* (2013.01); *H04W 4/021* (2013.01); *H04W 4/025* (2013.01)

(58) Field of Classification Search
CPC ............... B63B 59/06; Y10T 137/6903; Y10T 137/7371; Y10T 137/86276; G08G 1/0104; G08G 3/02; G01C 21/3679
See application file for complete search history.

(56) References Cited

U.S. PATENT DOCUMENTS

| | | | |
|---|---|---|---|
| 6,775,613 B2 * | 8/2004 | Burt | G01C 21/3679 340/995.24 |
| 2002/0198632 A1 | 12/2002 | Breed et al. | |
| 2004/0107042 A1 * | 6/2004 | Seick | G08G 1/0104 701/117 |
| 2006/0273930 A1 * | 12/2006 | Godden | G08G 1/0962 340/988 |
| 2009/0132156 A1 | 5/2009 | Craine | |
| 2009/0140886 A1 * | 6/2009 | Bender | B60R 25/00 340/988 |
| 2010/0052945 A1 | 3/2010 | Breed | |
| 2013/0076538 A1 | 3/2013 | Uno et al. | |
| 2013/0116917 A1 * | 5/2013 | Boehm | H04W 4/046 701/118 |

FOREIGN PATENT DOCUMENTS

WO 2013/179226 A1 12/2013

* cited by examiner

*Primary Examiner* — Frantz Bataille
(74) *Attorney, Agent, or Firm* — Ditthavong & Steiner, P.C.

(57) ABSTRACT

An approach is provided for providing map independent location-based notifications. The location-based notification platform causes an initiation of at least one spatial event request for one or more location-based notifications. The at least one spatial event request specifies at least one bounded area in which at least one device is located or to arrive. The location-based notification platform in response to the at least one spatial event request, receives at least one spatial polygon. The at least one spatial polygon represents at least one geographic area that is determined based on the at least one bounded area, and the at least one spatial polygon is associated with the one or more location-based notifications or one or more triggers for the one or more location-based notifications. The location-based notification platform then causes an overlay of the at least one spatial polygon on at least one travel network traveled by the at least one device.

20 Claims, 14 Drawing Sheets

400

410

420

430

METHOD AND APPARATUS FOR PROVIDING NOTIFICATIONS

BACKGROUND

Service providers and device manufacturers (e.g., wireless, cellular, etc.) are continually challenged to deliver personalized content and convenience to consumers. One area of interest has been mapping services and travel event notifications communicated to devices and users. However, these mapping services can require constant updating, indicate inaccurate locations, location and query privacy policies, as well as have demanding bandwidth requirements. Accordingly, service providers and device manufacturers face significant technical challenges to enabling event notifications to a user and/or user device independent of mapping services.

SOME EXAMPLE EMBODIMENTS

Therefore, there is a need for an approach for providing location-based notifications, for instance to alert of road conditions, to a device that can be independent of mapping services.

According to one embodiment, a method comprises causing, at least in part, an initiation of at least spatial event request for one or more location-based notifications. The at least one spatial event request specifies at least one bounded area in which at least one device is located. The method also comprises in response to the at least one spatial event request, receiving at least one spatial polygon. The at least one spatial polygon represents at least one geographic area that is determined based on the at least one bounded area, and the at least one spatial polygon further is associated with the one or more location-based notifications and/or one or more triggers for the one or more location-based notifications. The method further comprises causing, at least in part, an overlay of the at least one spatial polygon on at least one travel network traveled by the at least one device.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an initiation of at least spatial event request for one or more location-based notifications. The at least one spatial event request specifies at least one bounded area in which at least one device is located. The apparatus is also caused to in response to the at least one spatial event request, receive at least one spatial polygon. The at least one spatial polygon represents at least one geographic area that is determined based on the at least one bounded area, and the at least one spatial polygon further is associated with the one or more location-based notifications and/or one or more triggers for the one or more location-based notifications. The apparatus is further caused to cause, at least in part, an overlay of the at least one spatial polygon on at least one travel network traveled by the at least one device.

According to another embodiment, a computer-readable storage medium carries one or more sequences of one or more instructions which, when executed by one or more processors, cause, at least in part, an apparatus to cause, at least in part, an initiation of at least spatial event request for one or more location-based notifications. The at least one spatial event request specifies at least one bounded area in which at least one device is located. The apparatus is also caused to in response to the at least one spatial event request, receive at least one spatial polygon. The at least one spatial polygon represents at least one geographic area that is determined based on the at least one bounded area, and the at least one spatial polygon further is associated with the one or more location-based notifications and/or one or more triggers for the one or more location-based notifications. The apparatus is further caused to cause, at least in part, an overlay of the at least one spatial polygon on at least one travel network traveled by the at least one device.

According to another embodiment, an apparatus comprises means for causing, at least in part, an initiation of at least spatial event request for one or more location-based notifications. The at least one spatial event request specifies at least one bounded area in which at least one device is located. The apparatus also comprises means for receiving at least one spatial polygon in response to the at least one spatial event request. The at least one spatial polygon represents at least one geographic area that is determined based on the at least one bounded area, and the at least one spatial polygon further is associated with the one or more location-based notifications and/or one or more triggers for the one or more location-based notifications. The apparatus further comprises means for causing, at least in part, an overlay of the at least one spatial polygon on at least one travel network traveled by the at least one device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing map independent location-based notifications to a device, according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "location-based notification" refers to information regarding a dynamic and/or static travel event that can be presented as an oral and/or written alert, one or more vehicular driving instructions (e.g., for example, for controlling an autonomous car), among others, or a combination thereof. For example, a static travel event may relate to a school zone (e.g., reduced speed limit), speed trap, dangerous curve, dangerous intersection, and the like; and a dynamic travel event may relate to environmental road conditions (e.g., black ice, water, closed lanes, speed limits due to construction, etc.), accident, and the like. Although various embodiments are described with respect to the device being disposed within a vehicle, for instance, an autonomous vehicle or a highly-assisted-driving vehicle and a driver, it is contemplated that the approach described herein may be used with other devices, for instance, a mobile phone and a traveler.

Figure 1:
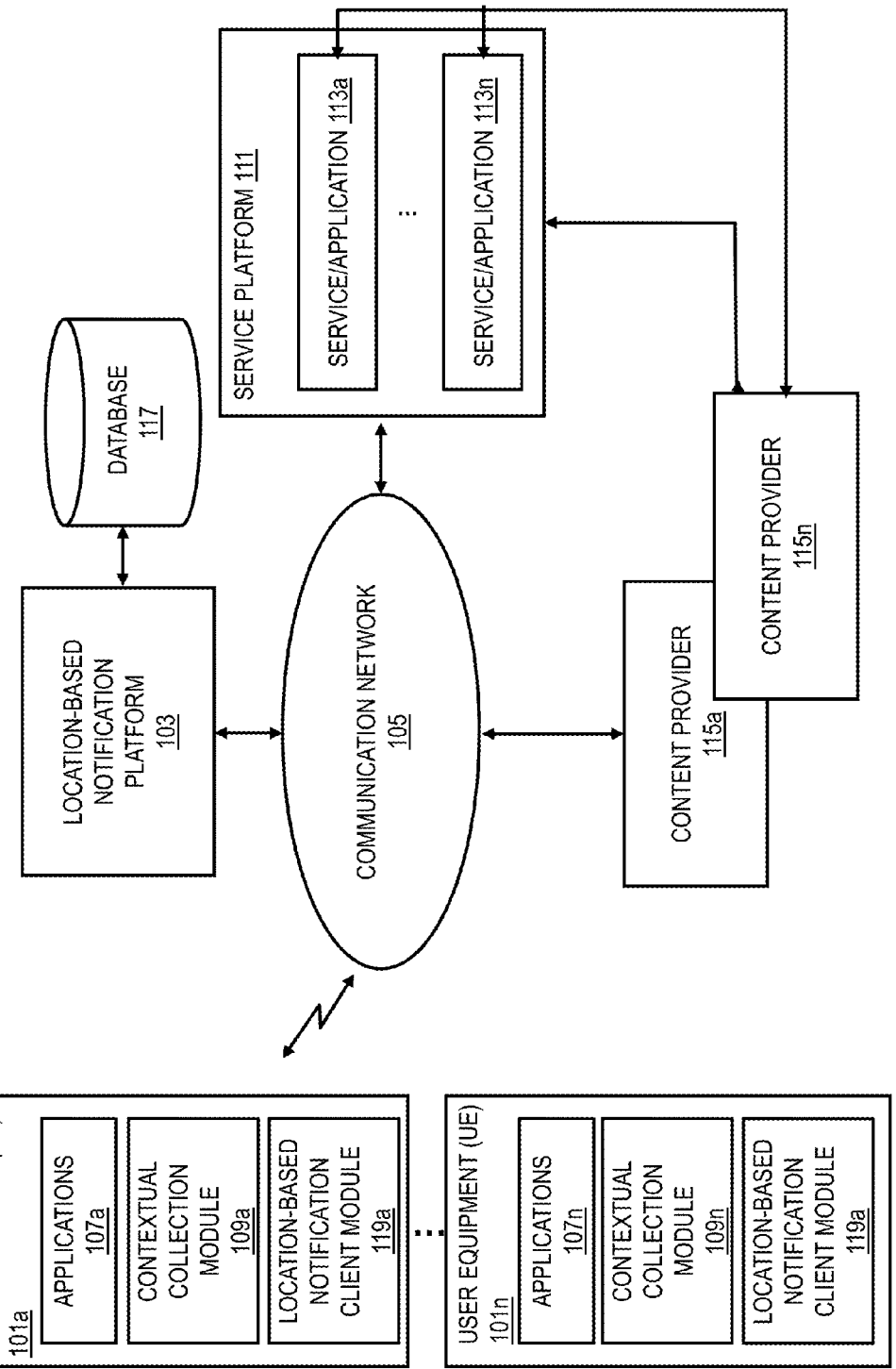
FIG. 1 is a diagram of a system capable of providing map independent location-based notifications to a device, according to one embodiment.

FIG. 1 is a diagram of a system capable of providing map independent location-based notifications to a device, according to one embodiment. Traditionally, location-based notifications are provided via portable and/or onboard navigation systems. However, the maps provided on these systems are not up-to-date and the transmission of an updated map can tax the bandwidth limitations. Additionally, many devices, for example, vehicles, do not have these systems.

To address this problem, a system 100 of FIG. 1 introduces the capability to providing location-based notifications to a device independent of mapping services. More specifically, the system 100 provides location-based notifications to devices based on minimally received information about the location of the device. For example, the system 100 can provide location-based notifications without having precise location information. The system 100 provides location-based notifications based on at least one spatial event request. The spatial event request specifies at least one bounded area in which at least one device is located and/or another bounded area, such as a location where the device will arrive to in the future. The bounded area may be any shape, for example, any polygon with three or more points. In one embodiment, the bounded area may be defined by a bounding box (e.g., {x1, y1, x2, y2}). In this way, the device does not need to provide its true location and therefore location privacy does not need to be breached. The system 100 therefore does not require active tracking of the location of the device and a reference map provided on the device.

In one embodiment, the system 100 processes the at least one spatial event request to determine at least one spatial polygon. The spatial polygon represents at least one geographic area that is determined area based on the at least one bounded area provided in the spatial event request. The at least one spatial polygon may be within the bounded area. The spatial polygon may any polygon with three or more points.

In one embodiment, there may be more than one spatial polygon. In one embodiment, there may be at least four different types of spatial polygons. Each spatial polygon is associated with one or more location-based notifications, one or more triggers for the one or more location-based notifications, among others, or a combination thereof. The one or more triggers may relate to factors (e.g., speed, direction, position in the spatial polygon, etc.) for applying the associated location-based notification, such as vehicular instructions or information. In one embodiment, at least one spatial polygon for an event may be selected from one of the four different types.

Each spatial polygon may include at least one event zone associated with the one or more location-based notifications and/or at least one triggering zone associated with the one or more triggers for the one or more one or more location-based notifications. The at least one event zone may relate to an area of the event (e.g., school, speed zone, dangerous curve, etc.). The event zone may be within the trigger zone or outside the trigger zone. For example, the school zone my within the trigger zone while the dangerous curve may be outside the trigger zone. The at least one trigger zone may relate to any sub-area within the spatial polygon. For example the trigger zone may relate to the entire spatial polygon, a sub-area related to entering the spatial polygon, a sub-area related to exiting the spatial polygon, etc. For example, the at least one trigger zone can take into account that there may be different location-based notifications for when entering the spatial polygon and for when exiting the spatial polygons. In some instances, the at least one event zone and the at least triggering zone may be the same.

In one embodiment, the types of spatial polygons may include corridor polygon, zone polygon, precedent polygon, and continuous polygon. Each of these spatial polygons may have different strategies to apply notifications, such as vehicular instructions or information. A zone polygon may have a boundary that represents at least one triggering zone and at least one event zone that lies within the boundary. For example, a zone polygon may be used for sensitive spatial entities, such as a schools or parks.

A corridor polygon may be a continuously overlaid polygon on the travel network and directional. The one or more location-based notifications for a corridor polygon for the travel network that is covered by the corridor. For example, a corridor polygon may be used for speed zones, for example, due to environmental conditions (e.g., flooded roads) as well as other conditions (e.g., construction zones).

A precedent polygon may include at least one triggering zone that precedes at least one event zone associated with the one or more location-based notifications. For example, a precedent polygon be used to inform the device and/user of upcoming static and/or dynamic conditions of the travel network (e.g., slippery road, dangerous curve, dangerous intersection, etc.).

The continuous polygon may include at least one triggering zone for triggering the one or more location-based notifications, at least one event zone through which the one or more location-based notifications are active, and at least one ending zone for ending the one or more location-based notifications. In this way, at least one location-based notification is triggered when the device enters the at least one triggering zone and deactivates when the device travels through the at least one ending zone. For example, a continuous polygon may be used to inform the device and/user of upcoming static and/or dynamic conditions of the travel network (e.g., slippery road, etc.).

In one embodiment, the system 100 can determine parameters (e.g., size of the geographic area, the distance between the event zone and the triggering zone, etc.) for the at least one spatial polygon based on type of event (e.g., speed trap, speed reduction, etc.), environmental conditions, contextual information, among others, or a combination thereof.

In one embodiment, the system 100 causes a virtual overlay of the at least spatial polygon on a travel network travelled by the device. The travel network, for example, may be a road network, bike paths, walking paths, among others, or a combination thereof. In this way, the device does not need any map and does not need to know the travel network to cause a triggering of one or more based location-based notifications.

In one embodiment, the system 100 can monitor location information of the device. In one embodiment, the system 100 cause triggering of the one or more location-based notifications if the location information indicates that the at least one device is within the at least one trigger zone, the at least one event zone, or a combination thereof. For example, if the device detects that the device is within the trigger zone of the associated spatial polygon, the device (e.g., vehicle and/or mobile phone) may cause content included in the one or more location-based notification to be displayed regarding the event zone (e.g., warning of the school zone). In another example, the device (e.g., a vehicle) may additionally or alternatively cause the instructions included one or more location based notification to be processed and executed by the driving control unit of the device.

In one embodiment, the system 100 can also determine a proximity of the at least one device to a boundary region of the at least one bounded area of the spatial request. The system 100 causes an initiation of at least one other spatial event request to receive at least one other spatial polygon, based, at least in part, on the determined proximity. In this way, a spatial event request is initiated for the device's route along the travel network.

In one embodiment, the system 100 triggers the one or more location-based notifications based, at least in part, on the determined contextual information associated with the at least one device, the at least one travel network, or a combination thereof. For example, the system 100 can determine the speed and/or the moving direction of the device. In another example, the system 100 can determine temporal information to determine whether a location-based notification for a school zone should be triggered.

As shown in FIG. 1, the system 100 comprises one or more user equipment (UEs) 101a-101n (also collectively referred to as UEs 101) having connectivity to a location-based notification platform 103 via a communication network 105. The UEs 101 may include or have access to an application 107 (or applications 107), which may consist of client programs, services, or the like, and/or location-based notification client module 119 that may utilize the location-based notification platform 103, or other services, applications, content, etc. available over the communication network 105. By way of example, the application 107 may be any type of application that is executable at the UE 101, such as location-based service applications, navigation applications, mapping application, content provisioning services, camera/imaging application, media player applications, social networking applications, calendar applications, and the like.

In one embodiment, the location-based notification platform 103 can determine one or more spatial polygon from a database 117 in response to a spatial event request received from the location-based notification client module 119 and/or the application 107. In certain embodiments, the database 117 may store up-to-date travel network information, event zone information (e.g., environmental conditions), among others, one or more spatial polygons, or a combination thereof. In one embodiment, the location-based notification platform 103 may create one or more polygons based on the event zones and travel network information. In this way, communication between the location-based notification client module and/or the application 107 and the location-based notification platform 103 may not be overwhelmed. For example, the location-based notification platform 103 does not have to monitor the location of the UE 101 (e.g., vehicle) that initiates the request.

In one embodiment, the location-based notification client module 119 or one of the applications 107 may act as a client for the location-based notification platform 103 and perform one or more functions associated with the functions of the location-based notification platform 103 by interacting with the location-based notification platform 103 over the communication network 105. In one scenario, the location-based notification client module 119 and/or application 107 may be an application for initiating the request for one or more spatial event requests and processing the at least one spatial polygon received from the location-based notification platform 103 or other component of the network 105 in response to the request. The location-based notification client module 119 and/or the application 107 can cause an overlay of the at least one spatial polygon on a travel network to cause a triggering of the one or more location-based notifications.

In certain embodiments, the location-based notification client module 119 and/or one of the applications 107 may determine the one or more location-based notifications may be based on contextual information (e.g., traveling direction, speed, etc.). In certain embodiments, the location-based notification client module 119 of the UE 101 can receive contextual information associated with the contextual collection module 109. For example, the contextual collection module 109 may utilize applications, services, sensors, etc., to collect such information, as well as contextual information. Information may include, for instance, location information, camera information, compass information, temporal information, user calendar information, accelerometer information, financial transaction information, etc. In one embodiment, the contextual collection module 109 may have connectivity to a location determination sensor system, such as a Global Positioning System (GPS) to access GPS satellites to determine e.g., location of the UE 101. The location-based notification client module 119 may then process the collected contextual information (e.g., traveling direction, speed, etc.) to generate spatial requests, determine the one or more location-based notifications and/or monitor the location information. For example, the location-based notification client module 119 can monitor the location information to determine the one or more-location notifications to present based on the received at least one spatial polygon.

By way of another example, if the location information of the UE 101, for example is determined by GPS, the platform 103 can use the precise information to narrow the size of the geographic area to determine at least one spatial polygon.

In one embodiment, the location-based notification platform 103 can obtain content information for determining the at least one spatial polygon in response to a request. The content information, for instance, includes environmental conditions, text information, geo-tagged data (e.g., indicating locations of people, objects, images, etc.), coupons, ads, among others, or a combination thereof. The content may be provided by the service platform 111 which includes one or more services 113*a*-113*n* (e.g., mapping service, content broadcasting service, etc.), the one or more content providers 115*a*-115*n* (e.g., public databases, etc.), other content source available or accessible over the communication network 105. In one embodiment, content is delivered from the content providers 115*a*-115*n* to the UE 101 through the service platform 111 and/or the services 113*a*-113*n*. For example, a service 113 a may obtain content (e.g., driving conditions) from a content provider 115*a* to deliver as a spatial polygon to the UE 101.

In one embodiment, the location-based notification client module 119 may store the one or more triggers and/or one or more location-based notifications locally. In another embodiment, the location-based notification client module 119 can obtain the one or more location-based notifications associated with at least one spatial polygon from the location-based notification platform 103 corresponding to the one or more triggers.

In another embodiment, the location-based notification client module 119 can receive all the location-based notifications for that bounded area in response to its request. In one example, the UE 101 can display all of the location-based notifications associated with a bounded area at once. In another example, the UE 101 can decide how to display/provide the notifications to the end user, for example, based on a timing pattern for showing the notifications. In yet another example, the vehicle can receive both the notification and triggers for the notification at once, and this way the vehicle can decide when to show the received notification based on the received trigger. In certain embodiments, the location-based notification platform 103 can prioritize the notifications or delay transmission of the notifications to the UE 101 so that the UE 101 does not get all the notifications at once.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The end user device or UEs 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, in-vehicle navigation device, a personal navigation device (PND), a portable navigation device, personal digital assistants (PDAs), a watch, audio/video player, digital camera/camcorder, positioning device, television receiver, radio broadcast receiver, electronic book device, game device, or any combination thereof, including the accessories and peripherals of these devices, or any combination thereof.

In one embodiment, the location-based notification platform 103 may be a platform with multiple interconnected components. The location-based notification platform 103 may include multiple servers, intelligent networking devices, computing devices, components and corresponding software for granting access to an autonomous vehicle or a highly-assisted-driving vehicle to execute one or more vehicular instructions, and configuring the vehicle to operate according to the one or more vehicular instructions (e.g., speed). In addition, it is noted that the location-based notification platform 103 may be a separate entity of the system 100, a part of the one or more services 113 of the services platform 111, or included within the UE 101 (e.g., as part of the applications 107).

By way of example, the UEs 101 and the location-based notification platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the location-based notification platform 103 and the location-based notification client module 119 and/or application 107 interact according to a client-server model. It is noted that the client-server model of computer process interaction is widely known and used. According to the client-server model, a client process sends a message including a request to a server process, and the server process responds by providing a service. The service process may also return a message with a response to the client process. Often the client process and the server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the term "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2A:
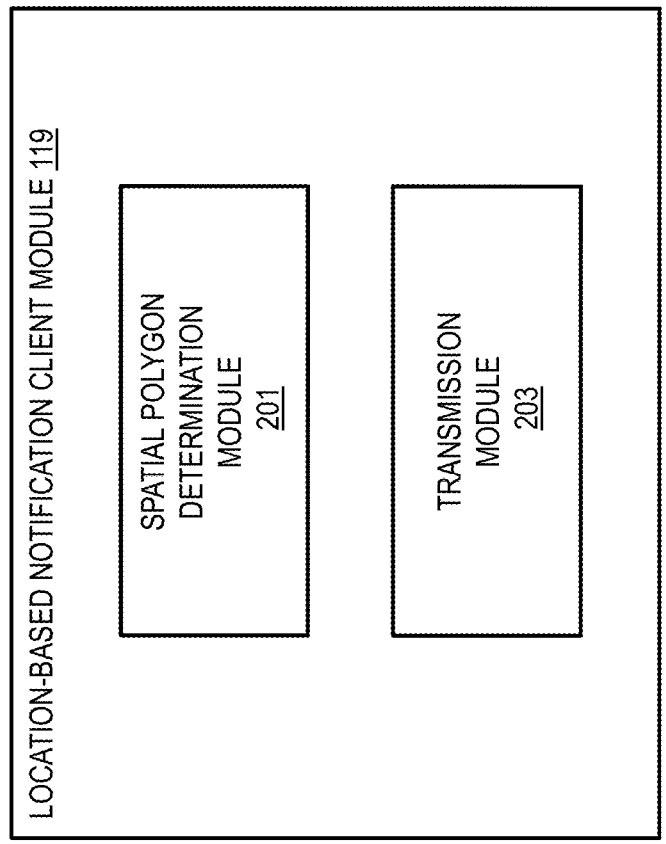
FIG. 2A is a diagram of the components of the location-based notification client module, according to one embodiment.

FIG. 2A is a diagram of the components of the location-based notification platform 103, according to one embodiment. It is contemplated that the functions of these components may be combined in one or more components or performed by other components of equivalent functionality. In this embodiment, the location-based notification platform 103 includes a spatial polygon determination module 201 and a transmission module 203.

The spatial polygon determination module 201 can process a spatial event request received from the location-based notification client module 119. In one embodiment, the spatial polygon determination module 201 can determine at least one spatial polygon based on the bounded area. For example, the spatial polygon determination module 201 determines at least one spatial polygon that is at least partially within the bounded area defined in the spatial event request. In certain embodiments, the spatial polygon determination module 201 may generate one or more polygons based on the up-to-date information stored in the database 117, information provided by the content providers 115 and/or the service platform 111, or a combination thereof. In one embodiment, the at least one spatial polygon may be one of the following: zone polygon, corridor polygon, spatial polygon, continuous polygon, or a combination thereof. In one embodiment, the spatial polygon determination module 201 may transmit the at least one spatial polygon to the device that initiated the request.

In one embodiment, the transmission module 203 may cause a transmission of the at least one spatial polygon to the at least one device that initiated the request. In one scenario, the transmission includes the one or more associated location-based notifications, one or more triggers for the one or more location-based notifications, or a combination thereof. By way of example, the transmission may include all of the one or more associated location-based notifications, one or more triggers, or a combination thereof. In another scenario, the transmission module 203 may priorities the notifications or delay transmission of the notifications to the device so that the device does not get all the notifications at once.

Figure 2B:
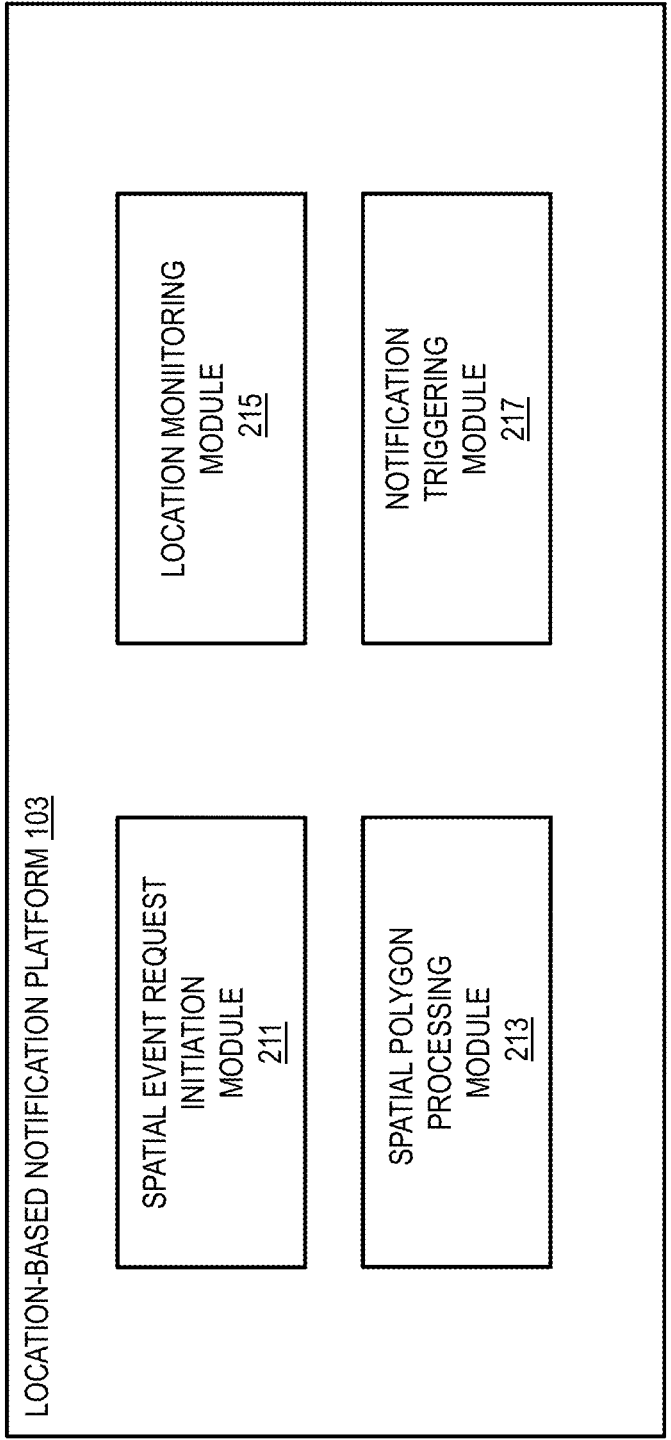
FIG. 2B is a diagram of the components of the location-based notification platform, according to one embodiment.

FIG. 2B is a diagram of the components of the location-based notification client module 119, according to one embodiment. It is contemplated that the functions of these components may be combined in one or more components or performed by other components of equivalent functionality. In this embodiment, the location-based notification client module 1119 includes a spatial event initiation module 211, a spatial polygon processing module 213, a location monitoring module 215, and a notification triggering module 217.

In one embodiment, the spatial event request initiation module 211 can cause an initiation of at least one spatial event request for one or more location-based notifications. In one embodiment, the device can initiate the spatial event request. The device can specify the at least one bounded area in which the at least one device is located and/or bounded area in which the at least one device will be located. By way of example, the device can determine a bounded area defined by a bounding box. In one embodiment, the bounded area can be predefined by the device. In certain embodiments, the device can cause transmission of the at least one spatial event request to the location-based notification platform 103 for processing.

In one embodiment, the spatial event request initiation module 211 can cause an initiation of at least another spatial event request if it is determined that the device is proximal to a boundary region of the bounded area in the initial request. In this way, the spatial event request initiation module 211 can initiate requests along the route traveled by the device along the travel network.

The spatial polygon processing module 213 can process the received at least one spatial polygon and associated one or more notifications and/or triggers from the location-based notification platform 103. The spatial polygon processing module 207 can cause an overlay of the at least one spatial polygon on at least one travel network traveled by the at least one device. In one example, the device does not have a map and thus does not know the travel network. In another embodiment, the spatial polygon processing module 213 can store locally the received one or more location-based notifications and/or triggers associated with the spatial polygon.

The location monitoring module 215 can monitor the location information of the device to see if the device is within at least one of the spatial polygons virtually overlaid on the route on the travel network. In one embodiment, the location monitoring module 215 can also monitor the location information of the device to determine whether it is proximal to the bounded area provided in the spatial event request.

The notification triggering module 217 causes a triggering of the one or more location-based notifications associated with the spatial polygon, for example, based on the location information of the device. For example, if the spatial polygon is associated with a speed zone (e.g., reduced speed zone due to a construction working area) and the location information indicates that the at least one device is within the at least one triggering zone, the at least one event zone, or a combination thereof, the notification triggering module 217 can cause the device (e.g., an autonomous vehicle or a highly-assisted-driving vehicle) to display an alert about the speed zone and/or cause the driving unit of the device to drive according to the speed associated with the speed zone.

In one embodiment, the notification triggering module 217 can further cause a triggering of the one or more location-based notifications associated with the spatial polygon based on contextual information. For example, if the spatial polygon is associated with a school zone (e.g., reduced speed during school hours) and the location information indicates that that the device is within the at least one triggering zone, the notification triggering module 217 can cause the device (e.g., an autonomous vehicle or a highly-assisted-driving vehicle) to display an alert about the speed zone and/or cause the driving unit of the device to drive according to the speed associated with the school speed zone if the notification triggering module 217 determines that the device is traveling in that zone during school hours. If the device is traveling on the weekend, for example, when the school speed zone is not effect, the notification triggering module 211 may not cause a trigger of the one or more location-based notifications.

In another example, if the spatial polygon is associated with a steep hill and the device is a mobile device being used during a bike ride, the notification triggering module 217 can cause the device to display a warning message about the steep hill on the device based on the location information and direction information provided by the contextual information. For example, the one or more location-based notifications for the steep hill may only be triggered when the user is traveling downhill (vs. going uphill).

The above presented modules and components of the location-based notification platform 103 and/or the location-based notification client module 119 can be implemented in hardware, firmware, software, or a combination thereof. Though depicted as a separate entity in FIG. 1, it is contemplated that the location-based notification platform 103 may be implemented for direct operation by respective UE 101. As such, the location-based notification platform 103 may generate direct signal inputs by way of the operating system of the UE 101 for interacting with the applications 107 and/or the location-based notification client module 119. In another embodiment, one or more of the modules 201-217 may be implemented for operation by respective UEs, the location-based notification platform 103, the location-based notification client module 119, or combination thereof. Still further, the location-based notification platform 103 and/or the location-based notification client module 119 may be integrated for direct operation with services 113, such as in the form of a widget or applet, in accordance with an information and/or subscriber sharing arrangement. The various executions presented herein contemplate any and all arrangements and models.

Figure 3A:
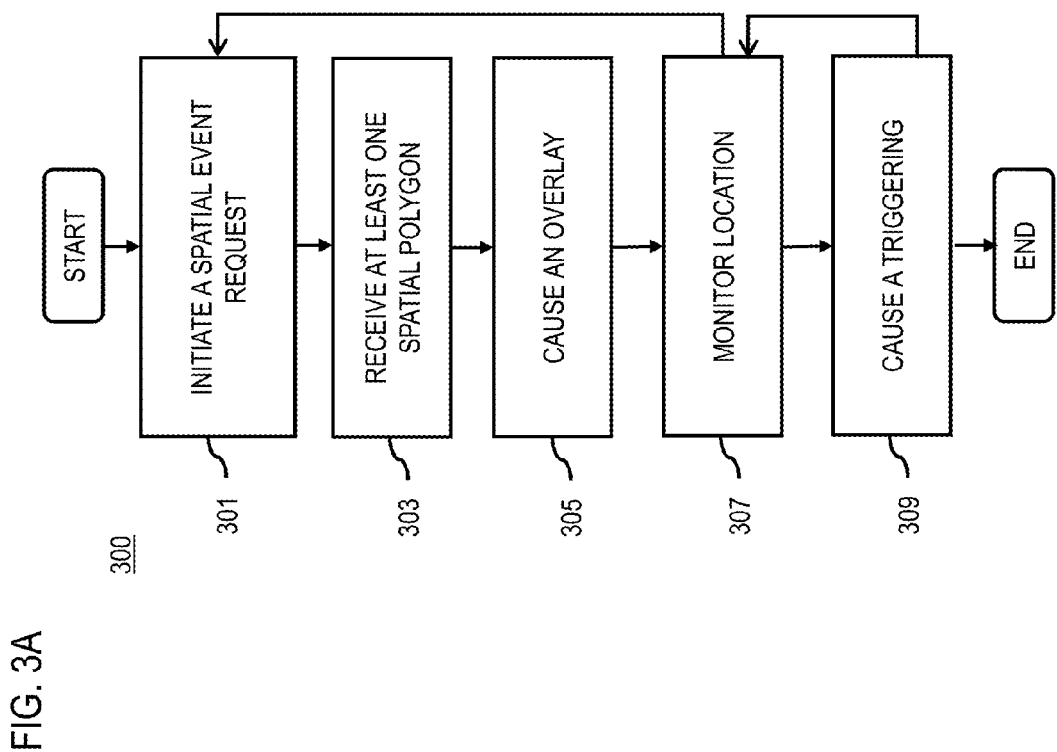
FIG. 3A is a flowchart of a process for initiating a request for location-based notifications and processing the received notifications, according to one embodiment.
Figure 8:
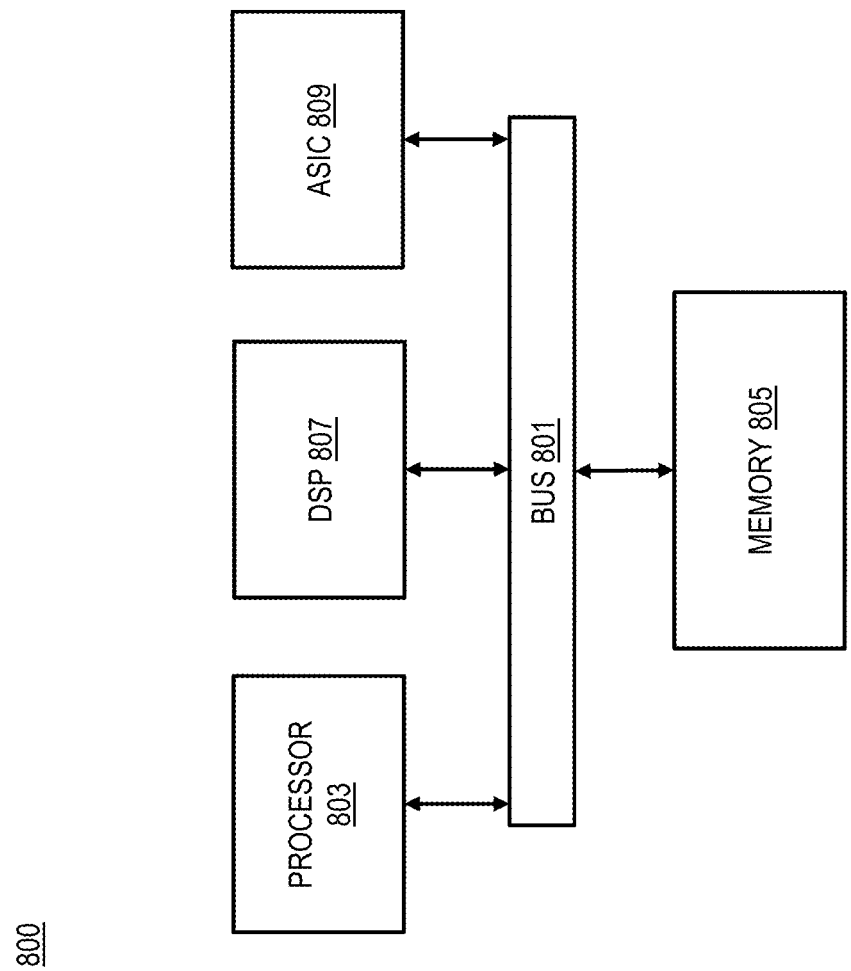
FIG. 8 is a diagram of a chip set that can be used to implement an embodiment of the invention.

FIG. 3A is a flowchart of a process for initiating a request and processing map independent location-based notifications to a device, according to one embodiment. In one embodiment, the location-based notification client module 119 and/or an application 107 of the UE 101 performs the process 300 and is implemented in, for instance, a chip set including a processor and a memory as shown in FIG. 8. Throughout this process, the location-based notification client module 119 is referred to as completing various portions of the process 300, however it is understood that the UE 101 can perform some of and/or all of the process steps.

In step 301, the location-based notification client module 119 causes an initiation of a spatial event request. In one example, the location-based notification client module 119 causes an initiation of a spatial event request that specifies a bounded area, for instance, within a bounded box, in which the device is located. In one embodiment, the location-based notification client module 109 causes the request to be transmitted from the device to the location-based notification platform 103 and/or another device (e.g., another vehicle or other device) having access to the database 117 (e.g., up-to-date map, environmental conditions, etc.). In this example, the request only relays the size of the box defined by the bounded box to the location-based notification platform 103. Thus, the request may not overwhelm the communication channel between the initiating device and the location-based notification platform 103.

The location-based notification client module 119 then receives the at least one spatial polygon from the location-based notification platform 103 (step 303). With the at least one spatial polygon, the location-based notification client module 119 can also receive the associated one or more location-based notifications, the one or more triggers for the one or location-based notifications, at least one event zone, at least one triggering zone, or a combination thereof. In one example, all of the notifications and/or triggers are received and stored locally. In other example, the notifications and/or triggers are received in a prioritized order from the location-based notification platform 103.

The location-based notification client module 119 then causes an overlay of the at least one spatial polygon on the at least travel network traveled by the at least the initiating device (step 305). For example, the module 119 does not require the device to have location knowledge of the road, the overlay of the at least one spatial polygon can be virtual on the at least one travel network. This can reduce the burden of the device's memory. For example, the spatial polygons (e.g., at least one event zone and/or the at least one trigger zone) can be overlaid in the bounded box in the at least travel network.

The location-based notification client module 119 can monitor location information associated with the device with respect to the bounded area and/or spatial polygon (step 307). For example, the location-based notification client module 119 determines that the device has entered the at least one triggering zone, the location-based notification client module 119 can cause a triggering of the one or more location-based notifications associated with the spatial polygon (step 309). For example, if the spatial polygon relates to a speed zone (e.g., reduced speed due to road conditions) and the location-based notification client module 119 determines that the device has entered the triggering zone associated with the speed zone (e.g., corridor polygon), the location-based notification client module 119 can cause the device to display the associated warning message and/or cause the driving control unit of the device (e.g., if an autonomous vehicle) to execute self-driving instructions (e.g., reduce speed according to speed zone) when in a driverless mode. In certain embodiments, the location-based notification client module 119 determines contextual information to determine whether or not to cause a triggering of the one or more location-based notifications. For example, the location-based notification client module 119 can determine a traveling direction of the device, speed of the device, temporal conditions, among others, or a combination thereof. In the above example, the location-based notifications may be inbound specific, and thus the location-based notification client module 119 may not cause the triggering of the location-based notifications associated with the spatial polygon if the location-based notification client module 119 determines that the vehicle is driving in the outbound direction, even though the device may have entered the triggering zone.

The location-based notification client module 119 can also monitor the location information to determine whether the device is proximal to the boundary (region) of the bounded area. If the location-based notification client module 119 determines that the device is about to exit the bounded area, the location-based notification client module 119 can cause another spatial event request to be initiated.

Figure 3B:
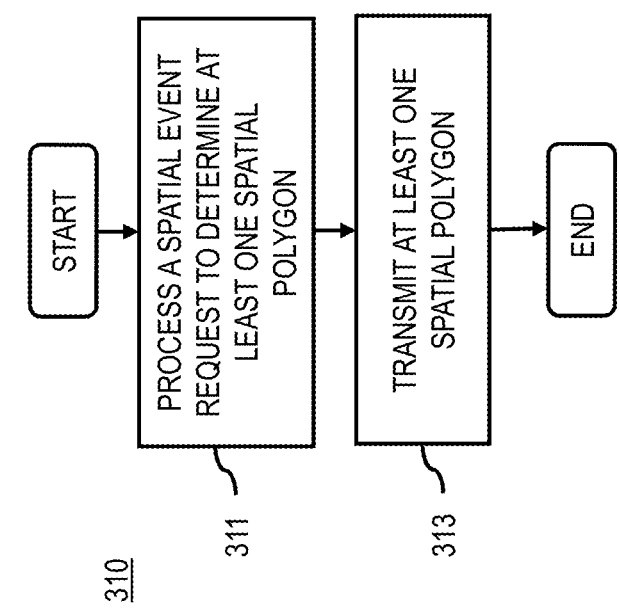
FIG. 3B is a flowchart of a process for determining one or more location-based notifications in response to an initiated request, according to one embodiment.

FIG. 3B is a flowchart of a process for processing a spatial event request to determine at least one spatial polygon, according to one embodiment. In one embodiment, the location-based notification platform 103 and/or an application 107 of the UE 101 performs the process 300 and is implemented in, for instance, a chip set including a processor and a memory as shown in FIG. 8. Throughout this process, the location-based notification platform 103 is referred to as completing various portions of the process 310, however it is understood that the UE 101 can perform some of and/or all of the process steps.

In step 311, the location-based notification platform 103 processes the spatial event request initiated by the location-based notification client module 119 to determine at least one spatial polygon that is at least partially within the bounded area specified by the at least one spatial event request. In one embodiment, the location-based notification platform 103 can select the one or more spatial polygons from a database. In certain embodiments, the location-based notification platform 103 can generate at least one spatial polygon, associated location-based notification(s), one or more triggers, at least one event zone, at least one triggering event or a combination thereof based on up-to-date maps, up-to-date environmental conditions, parameters (e.g., size of the geographic area, the distance between the event zone and the triggering zone, etc.), among others, or a combination thereof. By having another device to determine the at least one spatial polygon based on the bounded area specified in the request, the initiating device does not need to transmit the "true" location (i.e., does not need to breach location privacy).

The location-based notification platform 103 can cause transmission of the at least one spatial polygon to the device that initiated the request (e.g., the location-based notification client module 119) (step 313). The transmission of the at least one spatial polygon can include the associated location-based notification and the one or more triggers.

Figure 4A:
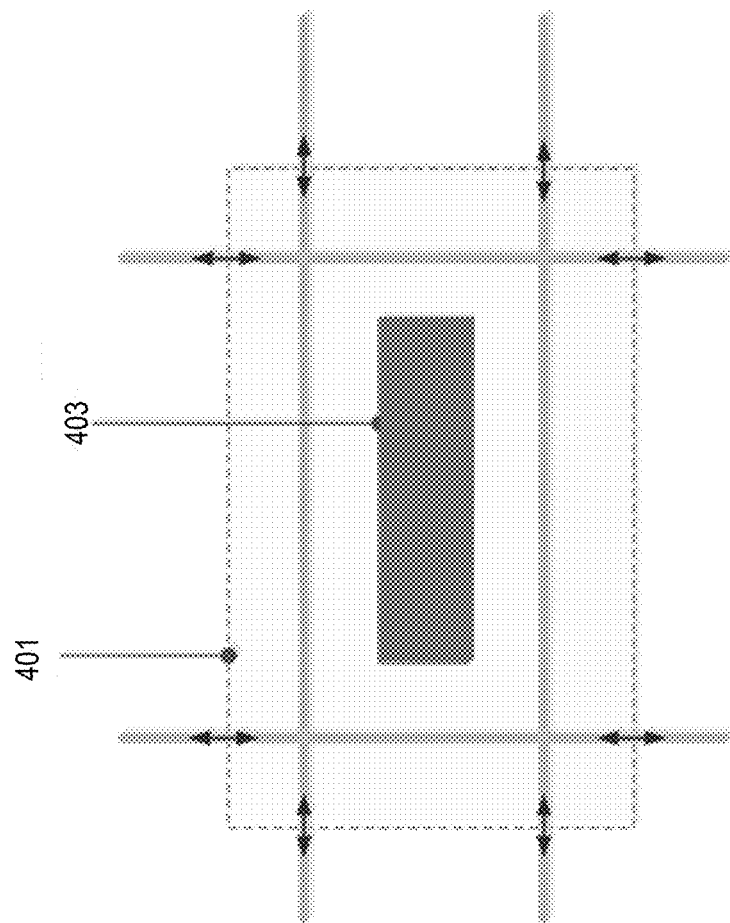
FIGS. 4A-4D are examples of different types of spatial polygons according to embodiments.

FIGS. 4A-4D are exemplary diagrams of different types of polygons that can be transmitted. FIG. 4A shows an example 400 of a zone polygon. In this example, the zone polygon is based on the event zone 403 that is sensitive spatial entity, such as a school or a park. In this example, the zone 403 surrounded by boundary 401. The boundary 401 represents at least triggering zone. The location-based notifications associated with this polygon for entering and/or leaving the triggering zone may be the same and/or different. The location-based notification platform 103 can determine to cause a trigger if the location information is within the zone by checking its location against the boundary 401.

Figure 4B:
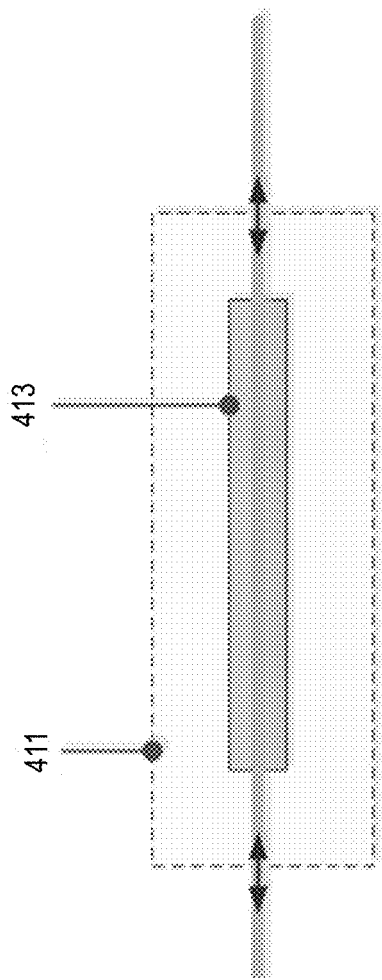

FIG. 4B shows an example 410 of a corridor polygon. In this example, the corridor polygon is based on the event zone 413, such as a speed zone or environmental conditions (e.g., road flooding). The boundary 411 represents the corridor. In this example, the event zone 413 can be located continuously on the travel network. The associated location-based notifications are for the entire travel network that is covered by the boundary 411.

Figure 4C:
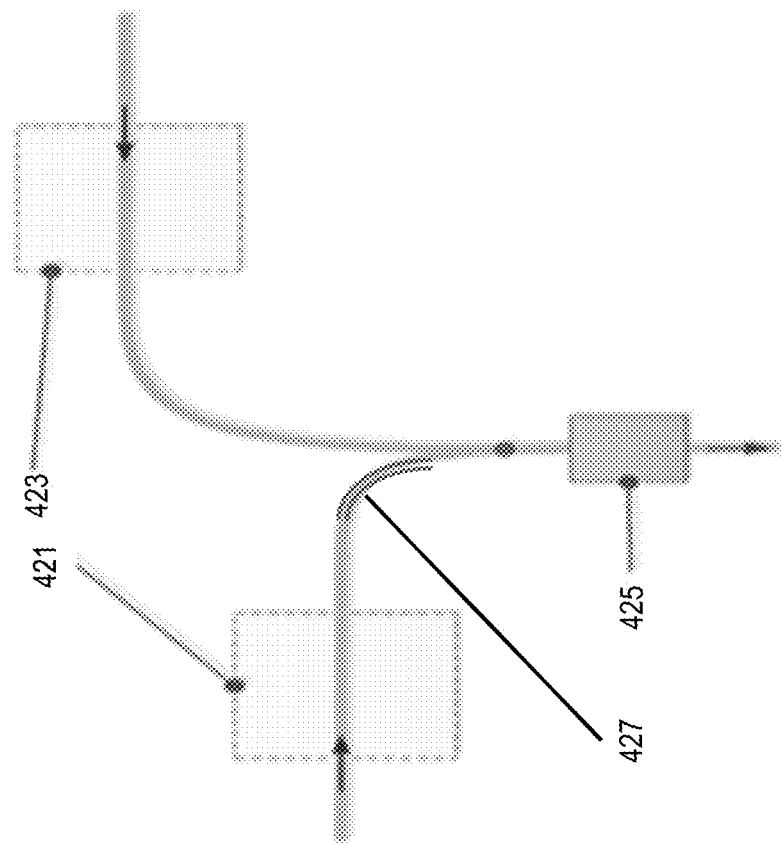

FIG. 4C shows an example of 420 of a precedent polygon. In this example, the precedent polygon is based on two event zones 425 and 427. Event zone 425 may relate to a slippery road and event zone 427 may relate to a dangerous curve (e.g., requiring reduced speed). In this example, box 421 represents a triggering zone that precedes the event zone 427 and the event zone 425 and box 423 represents a triggering zone that precedes the event zone 423. In this example, when a device enters either triggering zones 421 or 423, the location-based notification(s) associated with the event zone are caused to be triggered. For example, for event 425, the location-based notification(s) may include displaying a warning message indicating that a slippery road is ahead.

Figure 4D:
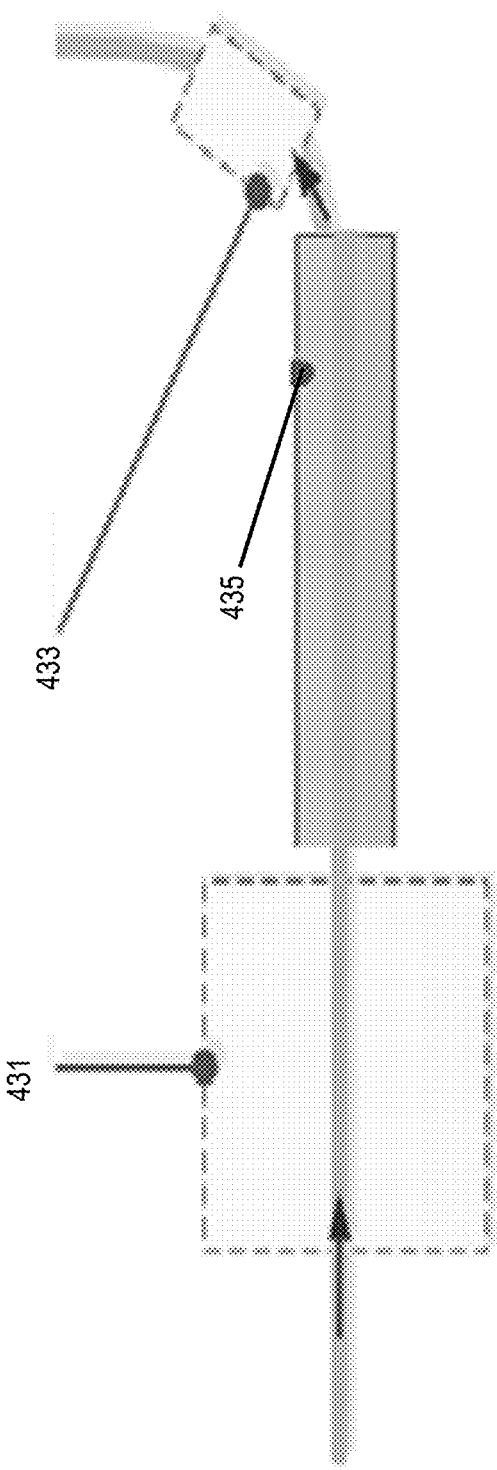

FIG. 4D shows an example 430 of a continuous polygon. In this example, the continuous polygon is based on event zone 435. The event zone 435 may relate to environmental conditions (e.g., slippery roads). In this example, box 431 represents a triggering zone that precedes the event zone and box 433 represents an ending zone. In this example, the location-based notification(s) are triggered when the device enters the event zone 431 and are deactivated when the device enters the ending zone 433.

Figure 5:
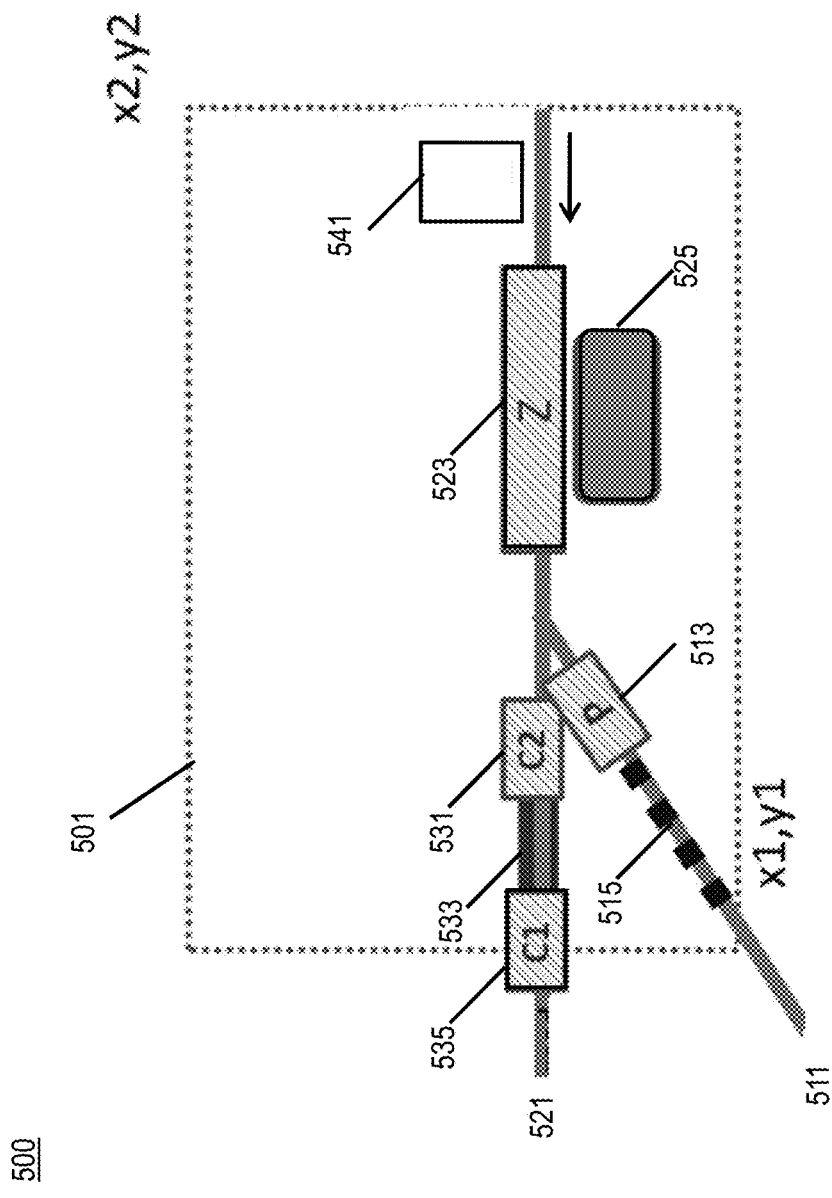
FIG. 5 is an example of at least one spatial polygon based on a spatial event request overlaid on a travel network.

FIG. 5 shows an example of at least one spatial polygon based on a spatial event request overlaid on a travel network. In this example, the spatial event request specifies the bounded area 510 defined by {x1, y1, x2, y2}. Based on the size of the bounded area 510, the location-based notification platform 103 transmits zones 513, 523, 531, and 535 for different spatial polygons. In this example, the triggering zone 523 relates to a zone polygon for event zone 525 (e.g., school and/or park); the triggering zone 513 relates to a precedent polygon that precedes event zone 515 (e.g., black ice); the triggering zone 531 and the ending zone 535 relate to continuous polygons for event zone 533 (e.g., flooded road). In this example, the location-based notification client module 119 determines the triggering of the associated one or more location-based notifications based on a location of the device 541 with respect to the zones 513, 523, 531, and/or 535.

Figure 6A:
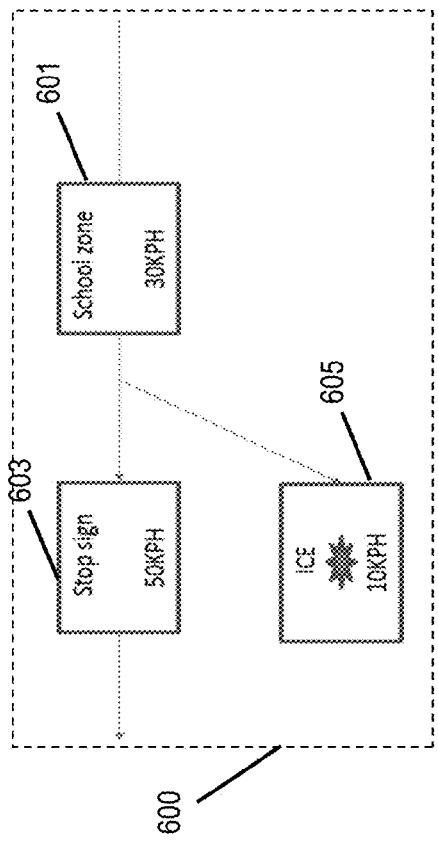
FIGS. 6A and 6B are diagrams of user interfaces utilized in the processes of FIGS. 3A and 3B and road network of FIG. 5, according to various embodiments.
Figure 6B:
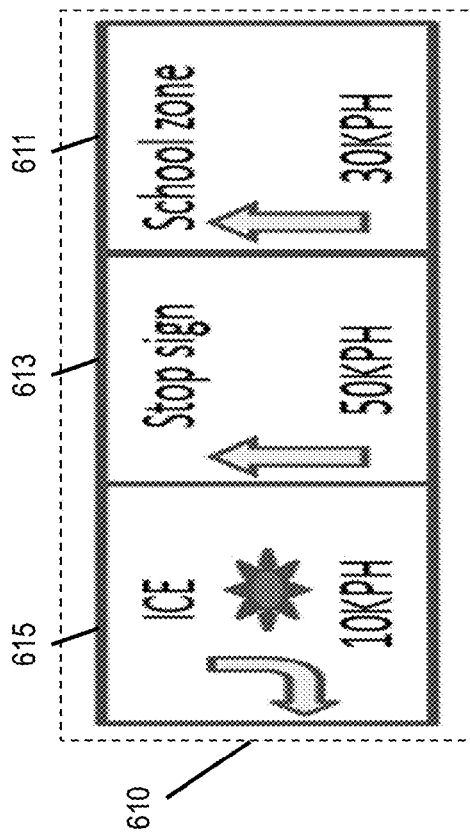

FIGS. 6A and 6B are diagrams of user interfaces showing location-based notifications utilized in the processes of FIG. 3 and network of FIG. 5, according to various embodiments. The examples of the location-based notifications are based on the example shown in FIG. 5. FIG. 6A show a user interface 600 for the location-based notifications associated with each of the spatial polygons. In some embodiments, the notifications may be displayed with respect to the travel network. For example, the notification 601 is associated with the triggering zone 523, the notification 603 is associated with the triggering zone 527 and the notification 605 is associated with triggering zone 513.

FIG. 6B show another user interface 610 for the location-based notifications associated with each of the spatial polygons. In some embodiments, the notifications may be displayed individually and/or associated with a travel direction. For example, the notification 611 is associated with the triggering zone 523, the notification 613 is associated with the triggering zone 527 and the notification 615 is associated with triggering zone 513.

The processes described herein for providing map independent location-based notifications to a device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
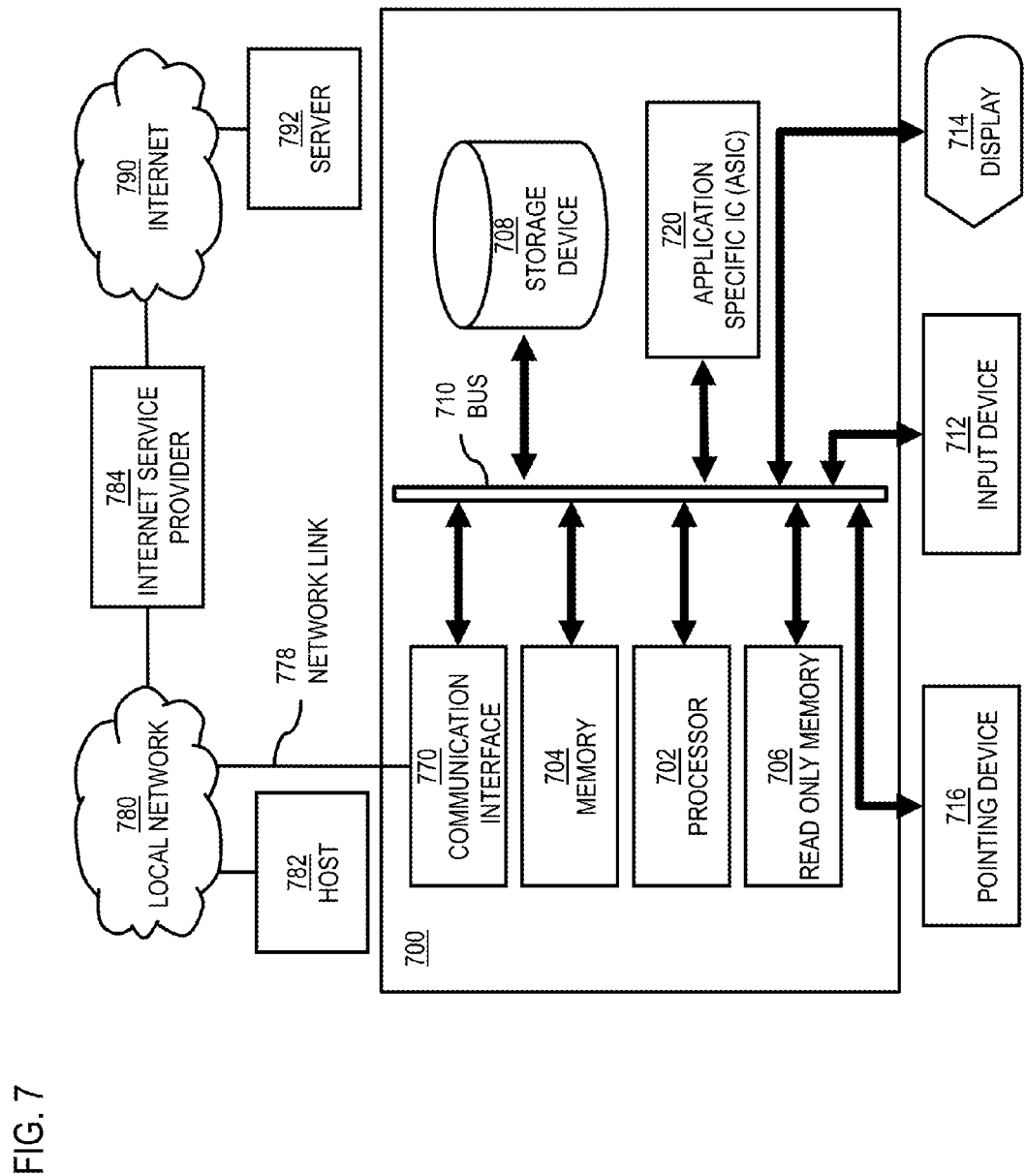
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide map independent location-based notifications to a device as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of to provide map independent location-based notifications to a device.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide map independent location-based notifications to a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing map independent location-based notifications to a device. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions to provide map independent location-based notifications to a device, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for determining content data to present to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide map independent location-based notifications to a device as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing map independent location-based notifications to a device.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide map independent location-based notifications to a device. The memory 805 also stores the data associated with or generated by the execution of the inventive steps.

Figure 9:
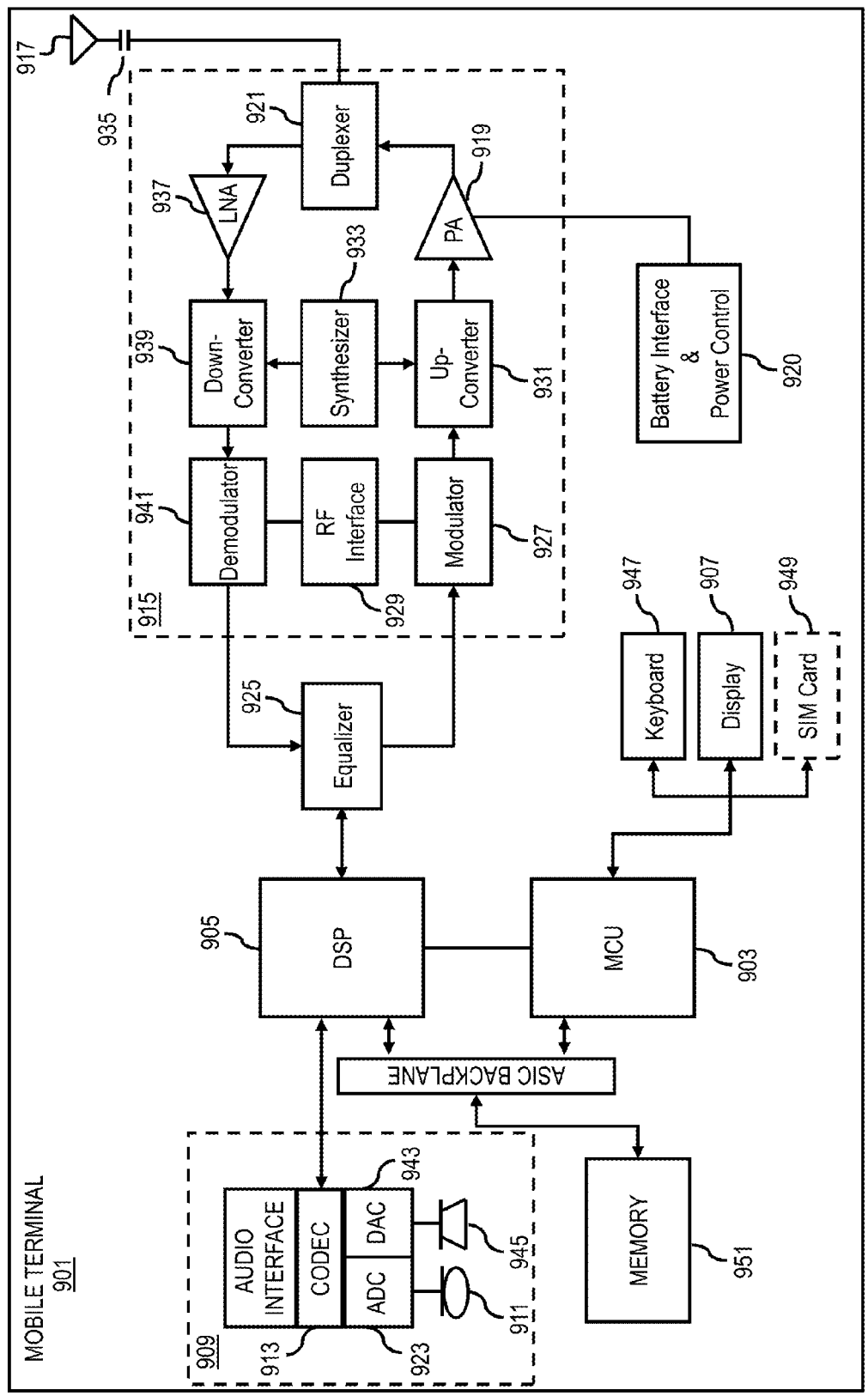
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing map independent location-based notifications to a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit.

A main display unit 907 provides a display to the user in support of various applications and mobile terminal functions that perform or support the steps of providing map independent location-based notifications to a device. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide map independent location-based notifications to a device. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   initiating, by a device, a transmission of a spatial event request via a wireless network to a remote service platform for a location-based notification associated with a spatial event, wherein the spatial event request specifies boundary coordinates that define a bounded area for determining the location-based notification without specifying current or projected coordinates of the device to the remote service platform;

in response to the spatial event request, receiving, from the remote service platform to the device, at least one spatial polygon located within the bounded area, wherein the at least one spatial polygon defines a geographic area associated with the spatial event and includes a triggering zone of the location-based notification; and triggering, by the device, a presentation of the location-based notification, a presentation of one or more vehicular driving instructions, a presentation of the bounded area, or a combination thereof on a user interface of the device when a location of the device is monitored by the device to be within the triggering zone.

2. A method of claim 1, wherein the one or more vehicular instructions are executed for one or more autonomous vehicular driving operations, wherein the device travels with an autonomous vehicle, a highly-assisted-driving vehicle, or a combination thereof, and wherein the coordinates of the device remain unknown to the remote service platform.

3. A method of claim 1, wherein the at least one spatial polygon further includes an event zone corresponding to an area of the spatial event that is in proximity to or within the triggering zone, and wherein the location-based notification is presented together with the bounded area on the user interface without displaying areas surrounding the at least one bounded area.

4. A method of claim 3, wherein the location-based notification is presented within the at least one spatial polygon in the bounded area.

5. A method of claim 1, further comprising:
independently determining, by the device, a proximity of the device to a boundary region of the bounded area without using map data of the areas surrounding the bounded area; and
initiating, by the device, a transmission of another spatial event request to the remote service platform to receive at least one other spatial polygon based, at least in part, on the determined proximity.

6. A method of claim 1, wherein the at least one spatial polygon is a zone polygon, wherein a boundary of the zone polygon represents the triggering zone, and wherein an event zone lies within the boundary.

7. A method of claim 1, wherein the at least one spatial polygon is a corridor polygon, wherein the corridor polygon is overlaid continuously on a path network travelled by the device and is directional, and wherein the location-based notification associated with the corridor polygon is applicable for a continuity of a corridor described by the corridor polygon.

8. A method of claim 1, wherein the at least one spatial polygon is a precedent polygon, and wherein the triggering zone of the precedent polygon precedes at an event zone associated with the spatial event.

9. A method of claim 1, wherein the at least one spatial polygon is a continuous polygon, and wherein the continuous polygon includes the triggering zone for triggering the location-based notification, at least one event zone through which the location-based notification is active, and at least one ending zone for ending the location-based notification.

10. A method of claim 1, further comprising:
determining, by the device, contextual information associated with the device, a path network travelled by the device, or a combination thereof,
wherein the triggering of the location based-notification is further based, at least in part, on the contextual information.

11. An apparatus comprising:
at least one processor; and
at least one memory including computer code for one or more programs,
the at least one memory and the computer program code configured to, with the at least one processor, cause the apparatus embedded in a device to perform at least the following:
initiate a transmission of a spatial event request via a wireless network to a remote service platform for a location-based notification associated with a spatial event, wherein the spatial event request specifies boundary coordinates that define a bounded area for determining the location-based notification without specifying current or projected coordinates of the device to the remote service platform;
in response to the spatial event request, receive, from the remote service platform, at least one spatial polygon located within the bounded area, wherein the at least one spatial polygon defines a geographic area associated with the spatial event and includes a triggering zone of the location-based notification; and
trigger, by the device, a presentation of the location-based notification, a presentation of one or more vehicular driving instructions, a presentation of the bounded area, or a combination thereof on a user interface of the device when a location of the device is monitored by the device to be within the triggering zone.

12. An apparatus of claim 11, wherein the one or more vehicular instructions are executed for one or more autonomous vehicular driving operations, wherein the device travels with an autonomous vehicle, a highly-assisted-driving vehicle, or a combination thereof, and wherein the coordinates of the device remain unknown to the remote service platform.

13. An apparatus of claim 11, wherein the at least one spatial polygon further includes an event zone corresponding to an area of the spatial event that is in proximity to or within the triggering zone, and wherein the location-based notification is presented together with the bounded area on the user interface without displaying areas surrounding the at least one bounded area.

14. An apparatus of claim 11, wherein the at least one spatial polygon is a zone polygon, wherein a boundary of the zone polygon represents the triggering zone, and wherein an event zone lies within the boundary.

15. An apparatus of claim 11, wherein the at least one spatial polygon is a corridor polygon, wherein the corridor polygon is overlaid continuously on a path network travelled by the device and is directional, and wherein the location-based notification associated with the corridor polygon is applicable for a continuity of a corridor described by the corridor polygon.

16. An apparatus of claim 11, wherein the at least one spatial polygon is a precedent polygon, and wherein the triggering zone of the precedent polygon precedes at an event zone associated with the spatial event.

17. An apparatus of claim 11, wherein the at least one spatial polygon is a continuous polygon, and wherein the continuous polygon includes the triggering zone for triggering the location-based notification, at least one event zone through which the location-based notification is active, and at least one ending zone for ending the location-based notification.

18. A non-transitory computer-readable storage medium carrying one or more sequences of one or more instructions which, when executed by one or more processors, cause an apparatus embedded in a device to perform:
   initiating, by a device, a transmission of a spatial event request via a wireless network to a remote service platform for a location-based notification associated with a spatial event, wherein the spatial event request specifies boundary coordinates that define a bounded area for determining the location-based notification without specifying current or projected coordinates of the device to the remote service platform;
   in response to the spatial event request, receiving, from the remote service platform to the device, at least one spatial polygon located within the bounded area, wherein the at least one spatial polygon defines a geographic area associated with the spatial event and includes a triggering zone of the location-based notification; and
   triggering, by the device, a presentation of the location-based notification, a presentation of one or more vehicular driving instructions, a presentation of the bounded area, or a combination thereof on a user interface of the device when a location of the device is monitored by the device to be within the triggering zone.

19. A non-transitory computer readable storage medium of claim 18, wherein the at least one spatial polygon further includes an event zone corresponding to an area of the spatial event that is in proximity to or within the triggering zone, and wherein the coordinates of the device remain unknown to the remote service platform.

20. The method of claim 1, wherein the monitoring of the location of the device against the at least one spatial polygon is performed by the device without intervention from the remote service platform after receiving the at least one spatial polygon from the remote service platform.

* * * * *